M. GOODFELLOW.
TRACTION WHEEL.
APPLICATION FILED NOV. 1, 1907.
907,991.
Patented Dec. 29, 1908.
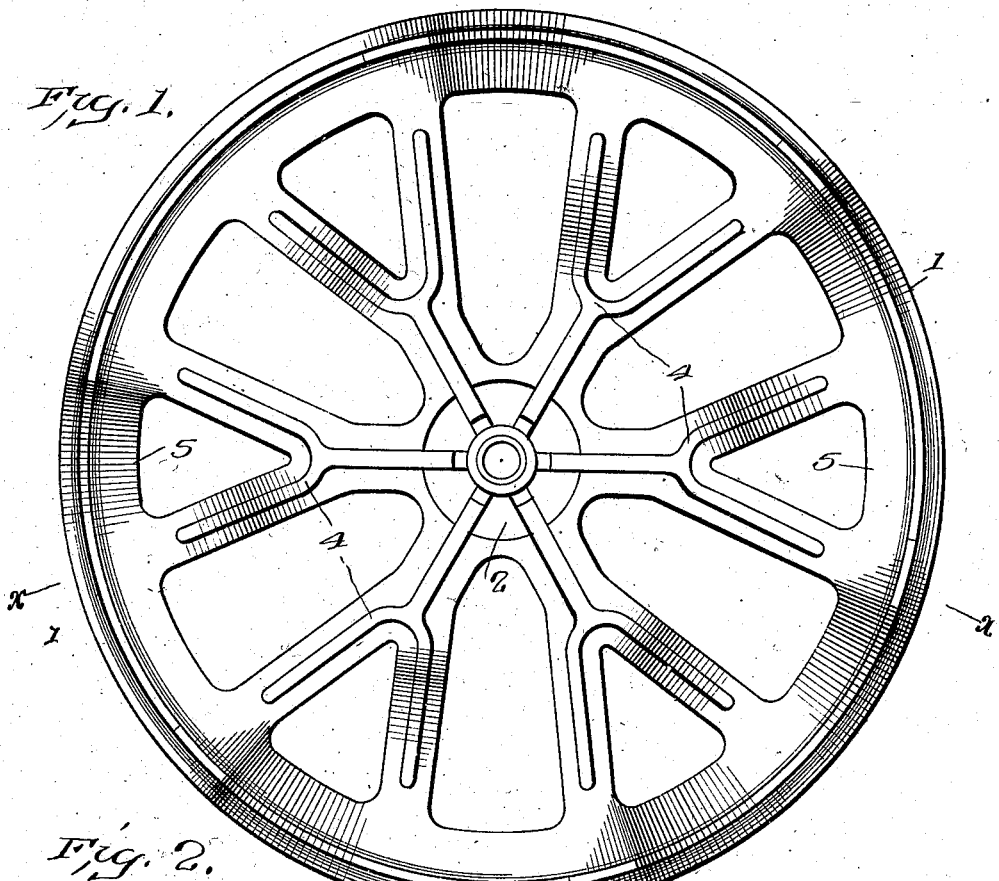
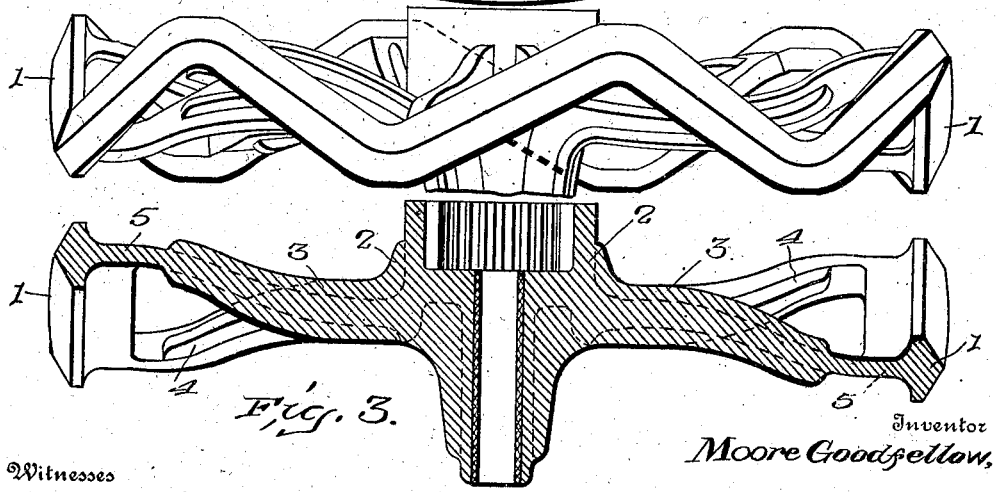
Witnesses
G. Howard Walmsley.
Edward S. Reed.
Inventor
Moore Goodfellow,
By H. A. Toulmin,
Attorney

UNITED STATES PATENT OFFICE.

MOORE GOODFELLOW, OF COLUMBUS, OHIO, ASSIGNOR OF ONE-HALF TO JOSEPH O. DYE, OF COLUMBUS, OHIO.

TRACTION-WHEEL.

No. 907,991.　　　Specification of Letters Patent.　　　Patented Dec. 29, 1908.

Application filed November 1, 1907. Serial No. 400,290.

*To all whom it may concern:*

Be it known that I, MOORE GOODFELLOW, a citizen of the United States, residing at Columbus, in the county of Franklin and State of Ohio, have invented certain new and useful Improvements in Traction-Wheels, of which the following is a specification, reference being had therein to the accompanying drawings.

This invention relates to traction wheels, and the object of the invention is to provide a wheel of this character which will have a maximum amount of tractive power and which will pick up a minimum amount of soil, thus maintaining a uniform traction and preventing the variation of the diameter of the wheel by accumulations of soil on the periphery thereof; further, to so construct the wheel as to prevent its slipping sidewise on uneven ground, thus enabling the machine or vehicle supported by the wheel to be steered in a straight line; and further, to provide a wheel which will serve to transport the machine on the road, as well as serving for traction purposes when in the field.

With these objects in view my invention consists in certain novel features of construction and in certain parts and combinations hereinafter to be described, and then more particularly pointed out in the claims.

In the accompanying drawings, Figure 1 is a side elevation of a traction wheel embodying my invention; Fig. 2 is a top plan view of the same; and Fig. 3 is a sectional view, taken on the line $x\,x$ of Fig. 1.

In these drawings I have illustrated the preferred form of my invention and have shown the wheel as comprising a rim 1, of a relatively small width and having a series of turns therein, whereby the rim is caused to extend first to one side and then to the other side of a vertical plane and is thus caused to extend about the wheel in a zigzag line. The angle at which these turns are made and the space between the successive turns may be altered to accommodate the same to varying conditions. This rim may be connected to a suitable hub 2 in any desired manner, but preferably in the manner here shown, which consists in providing a plurality of spokes 3, each connected at its inner end to the hub 2 and having its outer end bifurcated, whereby each spoke is substantially Y-shaped. The outer ends of the arms of the bifurcated portion of each spoke are bent toward the opposite sides of the body portion of the spoke and are connected to the rim 1 on opposite sides of the vertical plane above mentioned and preferably at the point where the angle or turn in said rim is formed.

In the form of wheel herein shown, in which the several parts are cast integral, the spokes are provided on their opposite sides with strengthening ribs 4 which extend from a point near the inner end of the spoke to a point near the outer ends of the arms thereof, the ribs following the contour of the spoke. In this form I have also shown the rim as extending on the opposite sides of a vertical plane taken through the center of the wheel, but this arrangement is not essential to the proper operation of the wheel and the position of the vertical plane may be altered relatively to the center of the wheel to accommodate the same to varying conditions. The rim is, as stated, of a small width and preferably has its periphery beveled toward the opposite sides thereof, thus providing a rim which is substantially V shaped in cross section and is therefore of such a construction that little or no soil will adhere thereto. This rim may also be provided on its inner face with an inwardly extending rib or flange 5, to which the outer ends of the spokes are connected. Thus it will be seen that I have provided a traction wheel having a narrow tread which in itself will pick up but a very small amount of soil and that, by beveling the edges of this tread in the manner described, the amount of dirt which will be picked up thereby is still further reduced, thus providing a wheel which will be of a uniform and unvarying diameter and the rim of which will at all times positively engage the surface of the ground, thereby insuring uniform traction; also that I have so constructed this wheel that it will give a maximum amount of tractive power, this result being accomplished by extending the rim of the wheel about the same in a zigzag line, or in such a manner that the rim extends first to one side and then to the other side of a straight line drawn through the center of the path of the wheel, thus causing that portion of the wheel which is in engagement with the ground to extend at an angle to the direction of movement of the wheel as a whole, thereby affording a large traction surface which gives a correspondingly large tractive power to the wheel; and further, that I have so constructed the wheel as to provide a maximum of strength and durability with a minimum of weight.

I wish it to be understood that I do not desire to be limited to the exact details of construction shown and described, for obvious modifications will occur to a person skilled in the art.

Having thus fully described my invention, what I claim as new and desire to secure by Letters Patent, is:—

1. A traction wheel comprising a rim having a series of turns therein, a hub, and a plurality of spokes, each connected at one end to said hub and provided at the other end with a pair of arms, said arms being connected to said rim on the opposite sides of a vertical plane.

2. A traction wheel comprising a rim, a hub, and a plurality of spokes, each connected at one end to said hub and having its other end bifurcated, the arms of said bifurcation being connected to said rim on opposite sides of a vertical plane taken transversely to said hub and on opposite sides of a plane taken longitudinally to said hub.

3. A traction wheel comprising a rim having a series of turns therein, whereby said rim is caused to extend first on one side of a vertical plane and then on the other side thereof, a hub, and a plurality of spokes, each connected at its inner end to said hub and having its outer end bifurcated, the arms of said bifurcation being connected to said rim on opposite sides of said vertical plane.

In testimony whereof, I affix my signature in presence of two witnesses.

MOORE GOODFELLOW.

Witnesses:
EDWARD L. REED,
HARRIET L. HAMMAKER.